(12) United States Patent
Schaefer

(10) Patent No.: US 11,761,191 B2
(45) Date of Patent: Sep. 19, 2023

(54) OUTDOOR DRAIN FILTER WITH FLOOD PROTECTION

(71) Applicant: Mark Thomas Schaefer, Woodbine, MD (US)

(72) Inventor: Mark Thomas Schaefer, Woodbine, MD (US)

(*) Notice: Subject to any disclaimer, the term of this patent is extended or adjusted under 35 U.S.C. 154(b) by 387 days.

(21) Appl. No.: 17/050,966

(22) PCT Filed: Mar. 6, 2019

(86) PCT No.: PCT/US2019/020905
§ 371 (c)(1),
(2) Date: Oct. 27, 2020

(87) PCT Pub. No.: WO2020/180309
PCT Pub. Date: Sep. 10, 2020

(65) Prior Publication Data
US 2021/0123226 A1  Apr. 29, 2021

(51) Int. Cl.
*E03F 5/14* (2006.01)
*F16L 55/07* (2006.01)
(Continued)

(52) U.S. Cl.
CPC .............. *E03F 5/14* (2013.01); *B01D 29/50* (2013.01); *C02F 1/001* (2013.01); *F16L 55/07* (2013.01);
(Continued)

(58) Field of Classification Search
CPC ............ E03F 5/0404; E03F 5/06; E03F 5/14; E03F 5/04; E03F 5/0401; E03F 5/0403;
(Continued)

(56) References Cited

U.S. PATENT DOCUMENTS

| | | | |
|---|---|---|---|
| 5,433,845 A | 7/1995 | Greene et al. | |
| 6,059,964 A * | 5/2000 | Strawser, Sr. ......... | E03F 5/0404 210/166 |

(Continued)

FOREIGN PATENT DOCUMENTS

CA  2848768 A1 *  3/2013  ............. B01D 21/28

OTHER PUBLICATIONS

Authorized Officer: Lee W. Young, International Search Report and the Written Opinion, International Patent Application No. PCT/US2019/020905, Completion Apr. 19, 2019, 8 pp.

*Primary Examiner* — Joseph W Drodge
(74) *Attorney, Agent, or Firm* — Offit Kurman, P.A.; Joseph P. Mathew

(57) ABSTRACT

The invention described herein is that of an outdoor drain filter useful for maintaining the operability of an outdoor drain despite the accumulation of debris that would otherwise obstruct the outdoor drain, resulting in flood prevention of surrounding areas. The outdoor drain filter of the present invention is placed above and around an existing outdoor drain or may be integral with a drain cover or drain reservoir. The outdoor drain filter comprises upper and side filtration means allowing the free flow of water therethrough. The outdoor drain filter further comprises a diverter comprising at least one air vent and at least one lateral pipe that defines a maximum water level to which water will accumulate around the outdoor drain before being diverted into the drain through the diverter. The outdoor drain filter may a manufactured unit or of modular construction.

16 Claims, 6 Drawing Sheets

(51) Int. Cl.
*F16L 55/24* (2006.01)
*B01D 29/50* (2006.01)
*C02F 1/00* (2023.01)

(52) U.S. Cl.
CPC .......... *F16L 55/24* (2013.01); *B01D 2201/32* (2013.01); *B01D 2221/12* (2013.01); *C02F 2301/04* (2013.01)

(58) Field of Classification Search
CPC ............. E03F 5/041; E03F 5/10; E03F 5/105; E03F 5/106; E03F 5/20; B01D 29/05; B01D 29/44; B01D 35/147; B01D 36/001; B01D 37/045; B01D 29/15; B01D 29/50; B01D 29/60; B01D 29/88; B01D 36/003; B01D 36/02; B01D 2201/04; B01D 2201/0415; B01D 2201/0423; B01D 2201/10; B01D 2201/30; B01D 2201/32; B01D 2201/48; B01D 2221/12; B01D 37/04; F16L 55/07; F16L 55/24; C02F 1/001; C02F 1/20; C02F 2301/04; C02F 2307/08
USPC ..... 210/747.3, 163, 166, 170.03; 404/2, 4, 5
See application file for complete search history.

(56) References Cited

U.S. PATENT DOCUMENTS

| | | | |
|---|---|---|---|
| 6,562,233 B1* | 5/2003 | Schilling | E03F 5/0404 404/4 |
| 6,926,464 B1 | 8/2005 | Weidmann | |
| 7,300,573 B1* | 11/2007 | Trangsrud | E03F 5/0404 210/163 |
| 7,470,362 B2* | 12/2008 | Kent | C02F 3/327 210/170.03 |
| 8,512,555 B1* | 8/2013 | Allen, II | B01D 24/08 210/170.03 |
| 8,950,123 B1 | 2/2015 | Chai et al. | |
| 2006/0078387 A1* | 4/2006 | Allard | E03F 5/0404 405/45 |
| 2006/0091049 A1* | 5/2006 | Hurst | E03F 5/0404 210/163 |
| 2006/0207922 A1 | 9/2006 | Dussich | |
| 2007/0205144 A1* | 9/2007 | Robinson | E04D 13/0767 210/163 |
| 2009/0255868 A1* | 10/2009 | Allen, II | E03F 1/002 210/170.03 |
| 2013/0068679 A1* | 3/2013 | Hannemann | E03F 5/14 210/170.03 |
| 2013/0092632 A1 | 4/2013 | Allard | |
| 2014/0069854 A1 | 3/2014 | Sutherland | |

* cited by examiner

OUTDOOR DRAIN FILTER WITH FLOOD PROTECTION

STATEMENT REGARDING FEDERALLY SPONSORED RESEARCH

This invention was made without federal funding.

BACKGROUND OF THE INVENTION

All existing outdoor ground and floor drains (collectively referred to throughout this disclosure as "outdoor drains") such as those installed outside of walkout basements or within low-lying landscape areas have perforated or slotted top drain covers, which purport to allow the passage of water into the drain while preventing the passage of debris that can clog the drain or connected pipes. Unfortunately, these drain covers quickly clog with debris such as grass clippings, leaves, mud and twigs, rendering them ineffective. Owners of properties with walkout basements or similar exterior floor drain areas, or landscape drainage systems incorporating similar components, must expend time and effort to keep the drain covers clean and free of debris or the outdoor drains will become obstructed and fail to drain quickly after the start of a rain event. Rain water then fills walkout basement stairwells or other areas surrounding the obstructed drain cover, eventually allowing water to flow into the basement or flood the otherwise surrounding area, as the case may be. This outcome defeats the purpose of outdoor drains and can cause significant property damage if not timely remediated.

Outdoor drains are installed in locations where standing water is not desirable. Yet for the reasons recited above, outdoor drains require continuous maintenance to remain operational. Current approaches to keeping outdoor drain covers unobstructed include laying netting, mesh or screen materials directly on top of the drain cover, which actually causes more rapid clogging. Advances over these techniques include replacing a standard flat drain cover with a conical or substantially cylindrical mesh or screen, which clogs less rapidly but ultimately becomes completely clogged nevertheless. Basement door thresholds are almost always lower than the height of these conical or cylindrical filters, which when clogged to threshold height, ultimately allow water into the adjacent basement. For this and the other reasons recited above, there exists a long felt need for a solution that is effective at substantially reducing the amount of maintenance required to keep outdoor drains unobstructed and prevent flooding of their surrounding areas.

BRIEF SUMMARY OF THE INVENTION

The invention of the present disclosure is that of an outdoor drain filter ("ODF") that increases the open surface area of outdoor drain covers manifold, significantly increasing the amount of time for the drain cover to become completely obstructed and cause the drain to fail. The invention further comprises a means for establishing a maximum water level (referred to throughout the present disclosure as a "diverter") so that once the filtration means of an ODF of the present disclosure are completely clogged, a diverter is provided that allows water to flow directly through the diverter into the unobstructed outdoor drain, thereby providing an additional safeguard against undesirable flooding.

DETAILED DESCRIPTION OF THE INVENTION

As one of ordinary skill in the art can infer from the preceding portions of the present disclosure, the area of an outdoor drain cover designed to prevent obstructions of the outdoor drain and allow water to flow into the drain (referred to throughout this disclosure as the "drainage area") is typically limited to the open surface area formed by perforations, slots or the like. However, when a drainage area of an outdoor drain cover becomes obstructed by grass, leaves or other types of debris, the remaining open surface area of the drainage area defines an "effective drainage area" that is limited to that surface area of the drainage area which remains unobstructed. It is a key objective of the invention to increase the effective drainage area of an outdoor drain by providing an ODF with side filtration means situated outside a perimeter of a drainage area of an outdoor drain cover such that the effective drainage area of the outdoor drain cover is significantly augmented, thereby maintaining the operability of the drain and preventing debris from obstructing the effective drainage area. It is a further objective of the invention of the present disclosure to provide a diverter for water accumulating to a maximum water level in the event that the provided side filtration means become obstructed, such that once water accumulates to the maximum water level, it is diverted into the open drain to prevent flooding of the surrounding areas.

Figure 1:
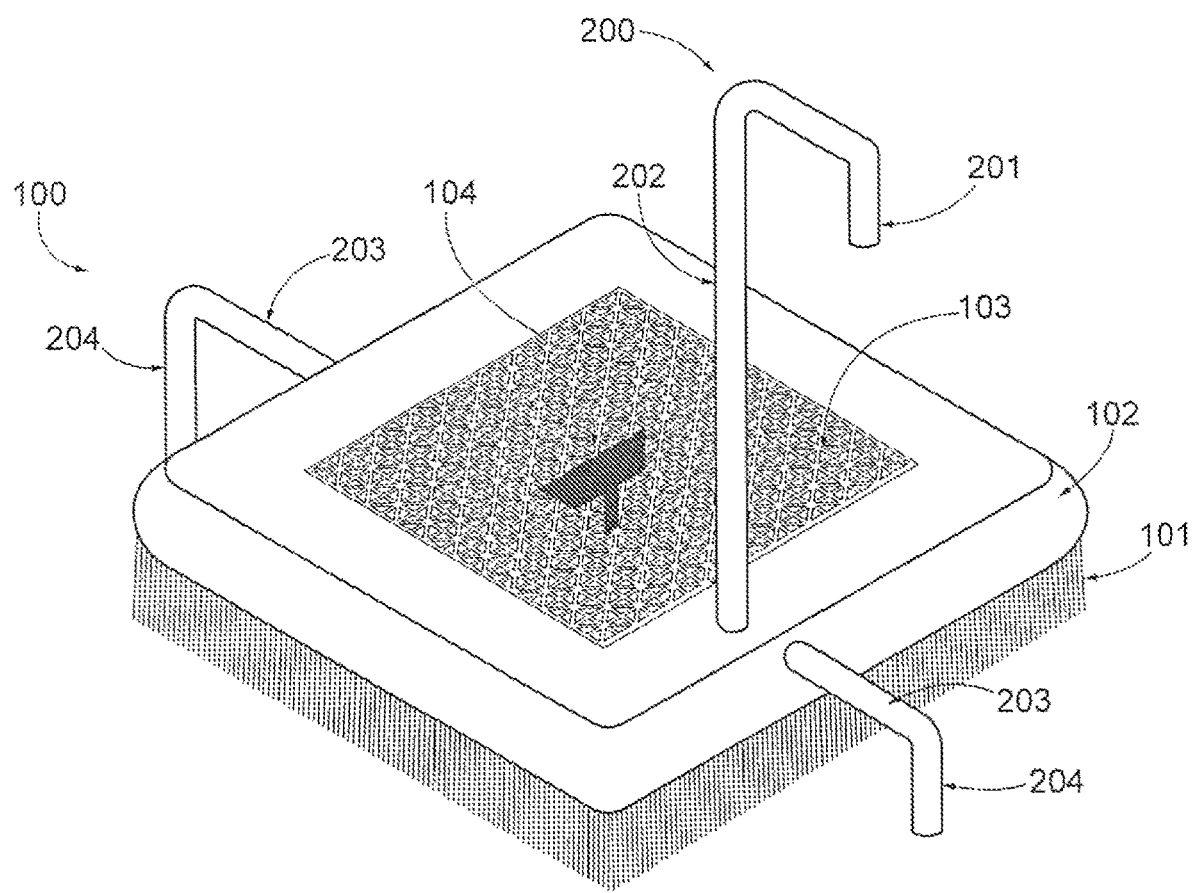
FIG. 1 shows a top isometric view of an embodiment of an ODF 100 of the present disclosure, comprising a side filtration means 101 which completely surrounds the perimeter of the outdoor drain cover (not shown), a frame 102 establishing the horizontal size and shape of the side filtration means 101, and an upper filtration means 103 for allowing water to flow vertically through the ODF and into the unobstructed outdoor drain (not shown). An optional spring-loaded thumb-turn 104 is shown in this embodiment for holding the ODF in place over the outdoor drain by locking into the underlying drain cover. The ODF 100 further comprises a diverter 200 comprising an air vent 201 configured as a pipe 202 protruding upward from at least one lateral pipe 203 preferably spanning the ODF in at least one dimension and at least one open-ended, downwardly protruding elbow ("downward elbow") 204, open-ended and situated at a desired maximum water level from the bottom of the ODF, the maximum water level 205 being defined by the height of the inner surface of the at least one lateral pipe 203.

Turning now to the drawings, FIG. 1 shows a top isometric view of an embodiment of the ODF 100 of the present disclosure comprising frame 102 defining the horizontal dimensions of a side filtration means 101, an upper filtration means 103 and a diverter 200. The diverter 200 comprises an air vent 201 turning downward from a pipe 202 protruding upward from at least one lateral pipe 203 preferable spanning at least one dimension of the ODF and with at least one downward elbow 204 at each end of the at least one lateral pipe 203. The at lower inner surface of the at least one lateral pipe 203 defines a maximum water level 205 at which water will enter the diverter 200 should it accumulate to that height. The embodiment of the ODF of FIG. 1 shows an optional thumb-turn 104 that enables the user to lock the ODF 100 onto an underlying drain cover.

One of ordinary skill in the art will appreciate that while the ODF 100 of FIG. 1 includes diverter 200 comprising a lateral pipe 203 spanning the width of the ODF 100 through the frame 102, that the lateral pipe 203 may alternatively be situated above or below the frame 102. Additionally, while the air vent 201 is configured a downturned extension ("downturn") of a pipe 202 protruding upward from the at least one lateral pipe 203, that any configuration that adequately vents the at least one lateral pipe 203 such that it draws water toward the outdoor drain when the maximum water level is achieved functions as an equivalent to the air vent 201 shown. One of ordinary skill in the art will also appreciate that while the air vent 201 of the ODF 100 of FIG. 1 is oriented in parallel with the underlying lateral pipe 203, any orientation that allows the at least one lateral pipe 203 to draw water when the maximum water level is achieved is equivalent.

Figure 2:
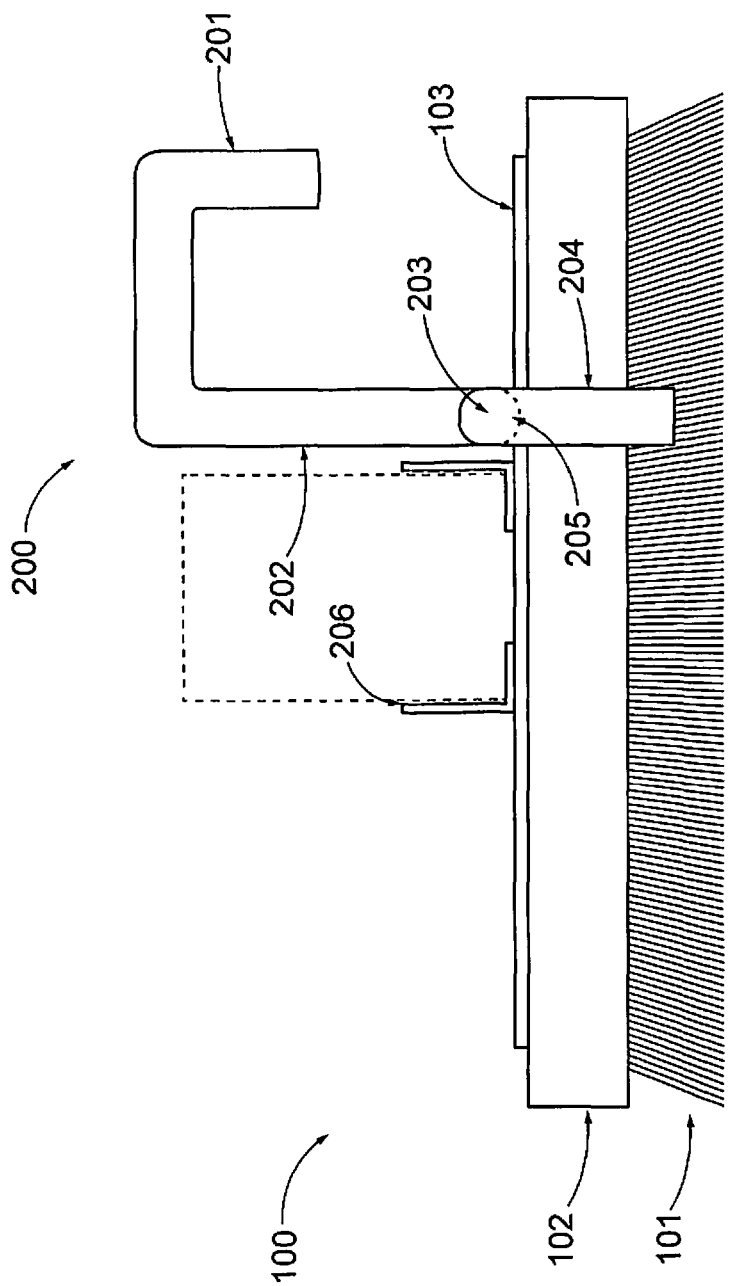
FIG. 2 shows a side view of an embodiment of an ODF 100 of the present disclosure, further comprising a diverter 200 comprising an air vent 201 configured as a pipe 202 protruding upward from at least one lateral pipe 203 preferably spanning the ODF in at least one dimension and at least one downward elbow 204, the lower inner surface of the at least one lateral pipe 203 defining a maximum water level 205 from the bottom of the ODF. This embodiment further comprises an optional bracket 206 for receiving a weight to help hold the ODF in a stationary position.

Turning now to FIG. 2, depicted is a side view of an embodiment of the ODF 100 of the present invention with a diverter 200 comprising at least one lateral pipe 203 situated above the frame 102 and upper filtration means 103 is shown. The illustrated ODF 100 comprises an air vent 201 comprising a downturn oriented perpendicular to the underlying at least one lateral pipe 203 and connected thereto by a pipe 202 protruding upwardly from the at least one lateral pipe 203. A maximum water level 205 is defined by the lower inner surface of the at least one lateral pipe 203, which is continuous with at least one downward elbow 204 situated outside the horizontal bounds of the side filtration means 101. In this embodiment, the ODF 100 further comprises a bracket 206 for receiving a weight, such as but not limited to a brick, as an alternative for holding the ODF 100 in place over the underlying outdoor drain.

Figure 3:
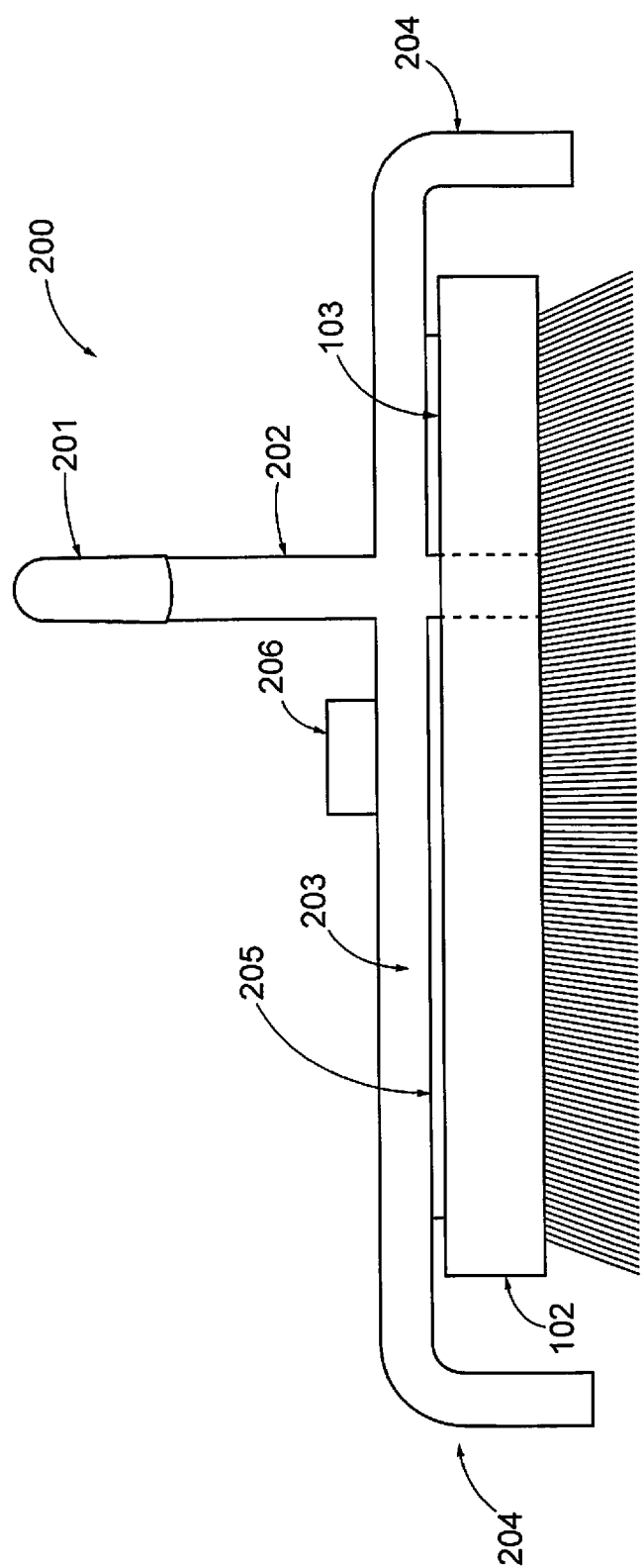
FIG. 3 shows a front view of an embodiment of an ODF 100 of the present disclosure, further comprising a diverter 200 comprising an air vent 201 configured as a pipe 202 protruding upward from the at least one lateral pipe 203, preferably spanning the ODF in at least one dimension and at least one downward elbow 204—the lower inner surface of the at least one lateral pipe 203 defining a maximum water level 205 from the bottom of the ODF—and a bracket 206 for receiving a weight.

Moving on to FIG. 3, a front view of an embodiment of the ODF 100 of the present disclosure is provided, again with the at least one lateral pipe 203 of the diverter 200 situated above the frame 102 and upper filtration means 103. The pipe 202 that protrudes upwardly from the at least one lateral pipe 203 is shown as extending downward through the frame 102. In this embodiment, the portion of the pipe 202 extending downward through the at least one lateral pipe 203 must be equipped with openings where the at least one lateral pipe 203 meets the pipe 202 in order for water drawn into the at least one lateral pipe 203 when the maximum water level 205 is reached drains downward. Also, in this embodiment, the bottom of the pipe 202 must be open ended to allow said water to flow into the underlying drain. One of ordinary skill in the art will appreciate that the pipe 202 may, but need not, extend downward beyond the upper surface of the at least one lateral pipe 203, which may simply comprise a hole into which entering water drains when the maximum water level 205 is reached.

Figure 4:
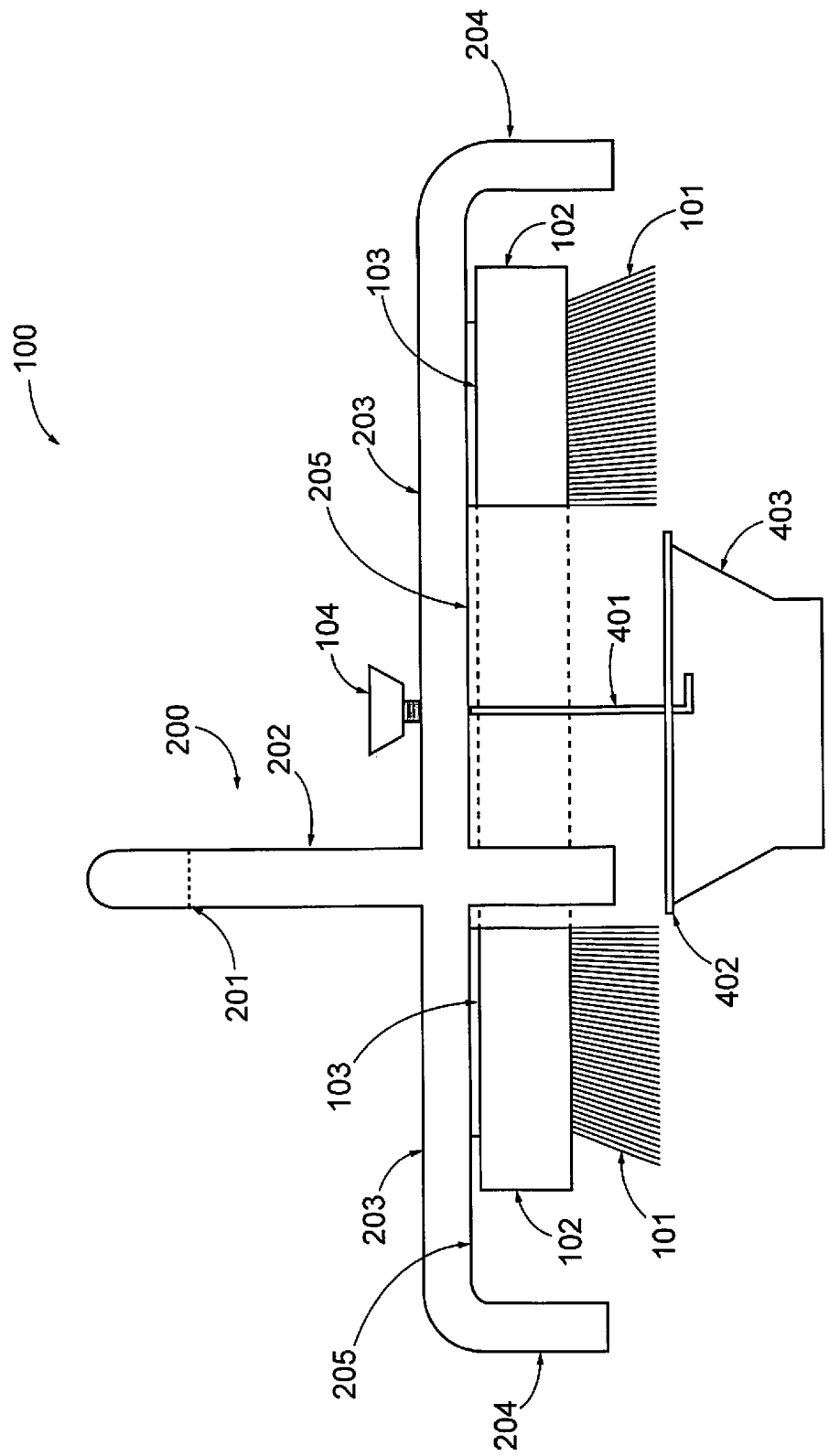
FIG. 4 shows a rear cross-sectional view of an embodiment of an ODF 100 of the present disclosure, comprising a side filtration means 101, a frame 102, and an upper filtration means 103 and an optional spring-loaded thumb turn 104 including a hook 401 capable of engaging a drain grate 402 of an existing drain 403.

FIG. 4 shows a cross-sectional rear view of an embodiment of the ODF 100 of the present invention similar to that shown in FIG. 3, except the optional bracket 206 is absent and instead an optional thumb-turn 104 is present, the thumb-turn 104 being continuous with a hook 401 capable of being inserted into a drain cover 402 through an opening in a grate, for example, then locked around an adjacent solid member of the grate to hold the ODF 100 in place over the underlying drain 403.

Figure 5:
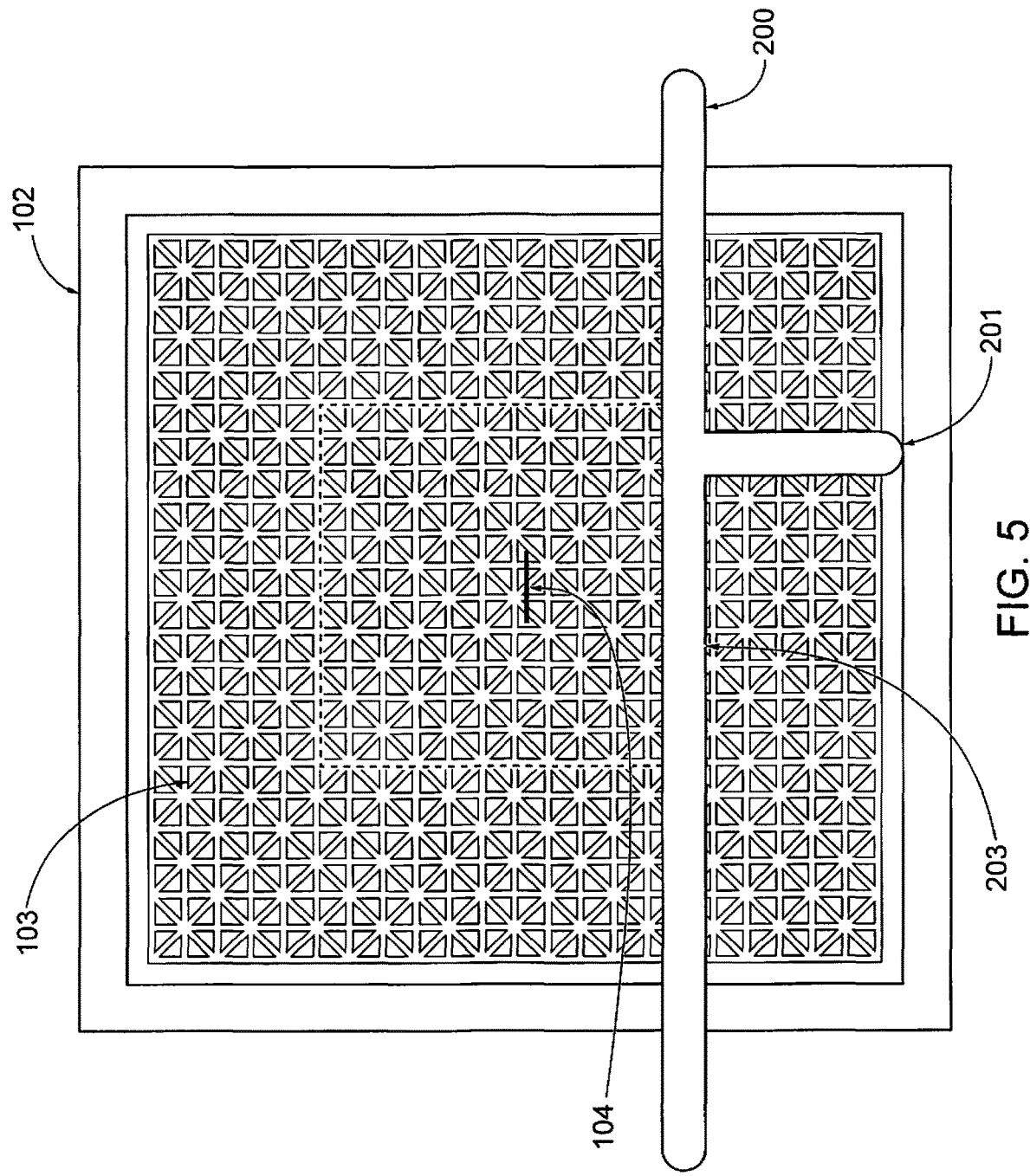
FIG. 5 shows a top view of an embodiment of an ODF 100 of the present disclosure, comprising a frame 102, an upper filtration means 103 and an optional spring-loaded thumb turn 104.

FIG. 5 shows a top view of an ODF 100 as described in the present disclosure, showing a diverter 200 comprising at least one lateral pipe 103 situated above the frame 102 and upper filtration means 203, with air vent 201 and optional thumb-turn 104 for locking the ODF 100 in place over an underlying drain as previously described.

Figure 6:
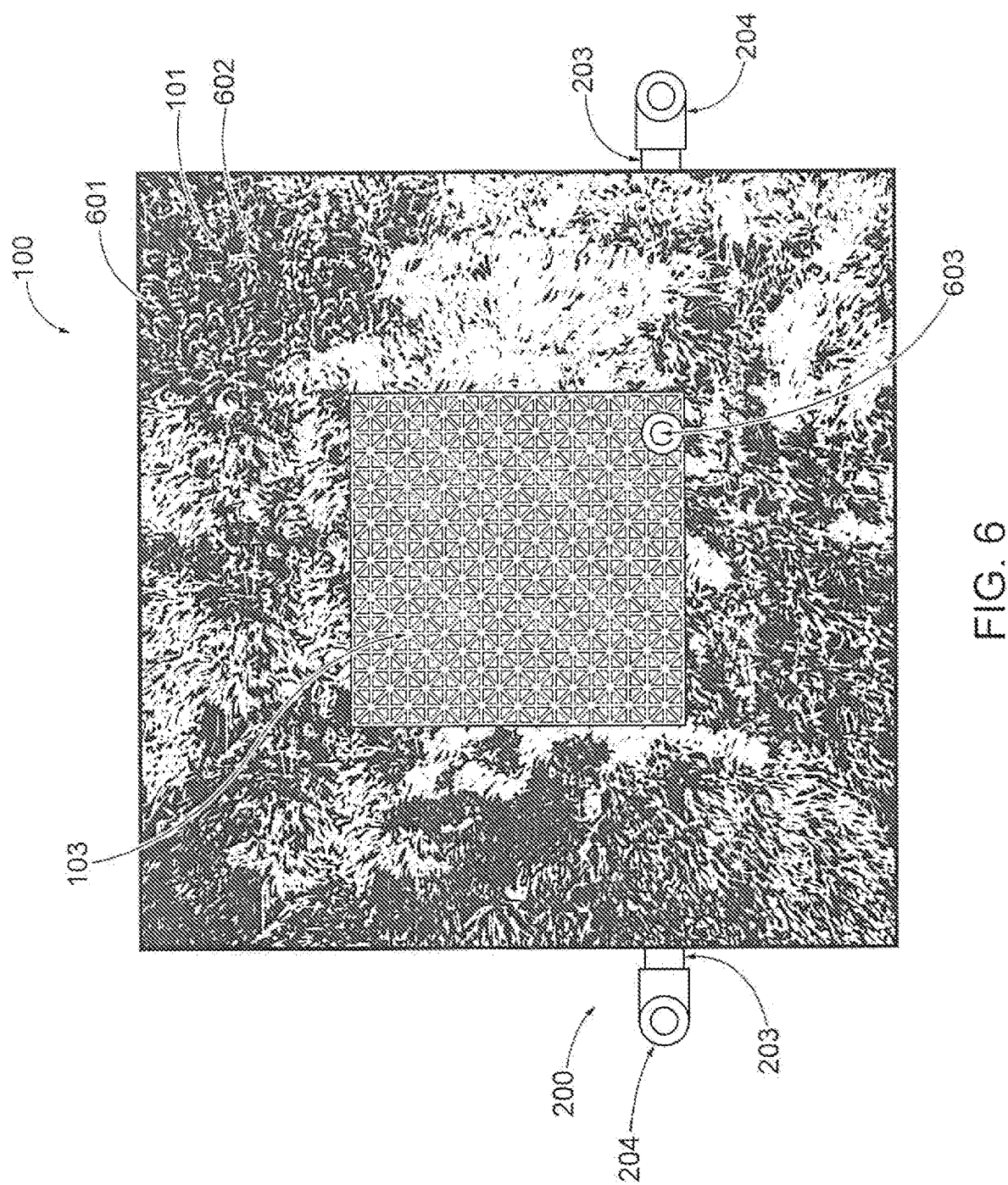
FIG. 6 shows a bottom view of an embodiment of an ODF 100 of the present disclosure, comprising a side filtration means 101 consisting essentially of side filtration members 601 and interstitial spaces 602 arranged beneath a top filtration means 103 with a diverter 200 configured with at least one lateral pipe 203 with downward elbows 204. In this embodiment, the diverter 200 is configured such that water drawn into the at least one lateral pipe 203 flows into the outdoor drain by way of a downspout 603 extending downward from the at least one lateral pipe 203 into the open drain.

FIG. 6 shows a bottom view of an embodiment of an ODF 100 of the present disclosure, comprising a side filtration means 101 consisting essentially of side filtration members 601 and interstitial spaces 602 arranged beneath a top filtration means 103 with a diverter 200 configured with at least one lateral pipe 203 with downward elbows 204. In this embodiment, the two concentric circles below the upper filtration means 103 represent a pipe 202 that extends downward past the at least one lateral pipe 203 and allows for drainage of water therefrom, and the downward elbows 204 outside the side filtration means 101 are in the form of coupled elbows as opposed to being continuous with the at least one lateral pipe 203, illustrating the possibility of modular construction of certain aspects of the invention.

The side filtration means 101 may be made of suitable material and of a suitable configuration to allow the passage of water through the side filtration 101 means and into an underlying outdoor drain even when debris accumulates around the ODF 100. In one embodiment, the ODF 100 is a standalone apparatus comprising an upper filtration means 103 and side filtration means 101 that may be placed above an existing outdoor drain cover such that the side filtration means 101 surrounds the perimeter of the drain cover and allows the flow of water into the open drain. In addition, an upper filtration means 103 is provided, and the side filtration means 101 allows water to flow into the drain through the side filtration means 101 even when the upper filtration means 103 becomes partially or completely obstructed.

The side filtration means 101 is configured as a plurality of side filtration members 601 separated by a plurality of interstitial spaces 602 which together act as an entry barrier for solid and waterborne debris that would otherwise accumulate above the outdoor drain. In certain embodiments, the side filtration means at least partially prevents the movement of sediment, and in particular waterborne sediment, into the outdoor drain. Sediment as referenced herein includes naturally occurring particulate material, wherein the particle sizes range from 1-800 microns, inclusive of all subranges within the range. The movement of sediment into the outdoor drain may be prevented due to the sediment particle sizes being too large to pass through the interstitial spaces 602 of the side filtration means 101, or due to the adherence of the sediment particles to the side filtration members 601 due to the physical forces present.

In a preferred embodiment of the ODF 100 of the present disclosure, the side filtration means 101 is of a vertical height less than or equal to a maximum water level 205, such that water can flow into a diverter 200 through an at least one lateral pipe 203 when the maximum water level 205 is reached. A maximum water level 205 may be determined according to manufacturing specifications supplied to a manufacturer of the ODF 100, or the height of the side filtration means 101 may be made adjustable such that a user of the ODF 100 of the present disclosure may select a desired water height from within a range of adjustment. One of ordinary skill in the art will appreciate that a selected maximum water level 205 will depend on the application of the ODF 100 of the present disclosure.

For example, as applied to a walkout basement setting, the maximum water level 205 desired will most likely be at or below a vertical height at which water, were it to rise to that level, would enter into the adjacent basement. For example, as applied to a landscape drainage scenario, the maximum water level 205 desired might be at or below a vertical height at which water, were it to rise to that level, might travel toward an outer building foundation located nearby, or into a useful area such as a garden, pool, patio, playground, shed or garage where it could cause undesirable flooding of the useful area. These examples are offered for the purposes of illustration and not limitation.

In certain embodiments of the present invention, the ODF components may be modular and sold separately so that multiple styles and configurations of both the side filtration means 101 and upper filtration means 103, with or without diverter 200, may be used interchangeably with one another. In other embodiments of the present invention, an ODF 100 of the present disclosure may be integrated with a drain cover to provide a drain cover comprising an ODF or one or more ODF components. In certain embodiments, an ODF 100 of the present disclosure may be integrated with an outdoor drain reservoir, such as an outdoor drain box, thereby obviating the need for a standalone or integrated drain cover. In such embodiments, one of ordinary skill in the art will appreciate that the upper filtration means 103 will act as a drain cover, albeit elevated above the drain according to the collective height of the side filtration means 101 and frame 102.

The ODF 100 comprises a side filtration means 101 which completely surrounds the perimeter of an underlying drain cover. One of ordinary skill in the art will understand that the side filtration means 101 must be of appropriate configuration and material to allow drainage of water therethrough while preventing clogging of the drain cover. For example, the side filtration means 101 may be configured as a plurality of bristles or bristle-like members that allow water to drain in between them even when obstructed by debris. Alternatively, the side filtration means 101 may be configured as a water-permeable membrane or similar means of allowing the passage of water therethrough. For example, the side filtration means 101 may be configured as bristles, bristle-like members, baffles, registers, vents, water-permeable membranes, screens, sponges, meshes, or any structure adequate for allowing water to flow into the underlying drain at an operable rate.

One of ordinary skill in the art will appreciate that the ODF components or an integrated ODF assembly of the present invention must be constructed of materials capable of withstanding outdoor stresses such as sunlight, precipitation, heat and cold temperatures while remaining intact and operable. For example, the ODF or ODF components may be made of metal, treated or untreated wood, rubber, plastic, thermoplastic, polyvinyl chloride (PVC) or other synthetic material suitable for the desired application. An ODF of the present disclosure or ODF components may be made using known manufacturing processes such as molding or extrusion, for example and not by way of limitation.

One of ordinary skill in the art will appreciate that the upper filtration means 103 may resemble that of an underlying drain cover, comprising a drainage area defined by an open surface area which is further defined by slots, perforations, holes, or other openings that allow the downward flow of water into the underlying drain. These examples are provided for illustrative purposes and are not meant to be considered limitations of the present invention.

One of ordinary skill in the art will appreciate that a side filtration means 101 of the present disclosure may comprise equivalent structures to those depicted herein and may be selected from the group consisting of structures that allow for the adequate flow of water through the side filtration means 101 to achieve the purpose of the invention. One of ordinary skill in the art will further appreciate that the side filtration means 101 will be present around perimeter of an ODF 100 beneath the frame 102, with the central area of the upper filtration means 103 occurring within the inner horizontal perimeter of the side filtration means 101 and/or frame 102. This configuration allows for the downward flow of water through the upper filtration means 103, and in the event that the upper filtration means 103 becomes obstructed, water may continue to flow through the side filtration means 101 to reduce the accumulation of water in the area surrounding the outdoor drain the ODF 100 is designed to maintain in operable condition.

A diverter 200 of the present invention comprises an air vent 201 configured in any manner suitable for allowing the draw of water into the at least one lateral pipe 203 of the present invention when the maximum water level 205 is reached. The at least one lateral pipe 203 may span the frame 102 or ODF 100 in at least one dimension and terminate at each end with at least one downward elbow 204, open-ended to allow water to rise to the maximum water level 205 defined by the lower inner surface of the at least one lateral pipe 203 of the diverter 200. One of ordinary skill in the art will appreciate that the diverter 200 provides an additional layer of functionality with respect to maintaining the subject outdoor drain in and operable state and preventing the accumulation of water above the maximum water level 205. Thus, an ODF 100 of the present disclosure may be selected, for example, wherein the height of the lower internal surface of the at least one lateral pipe is lower than the height of a water level that would result in undesirable flooding of a surrounding area of an outdoor drain. An ODF 100 of the present invention may comprise multiple lateral pipes extending in any possible angle from the upper pipe 202 outward toward the perimeter of the ODF 100.

What is claimed is:

1. An outdoor drain filter for placement over an outdoor drain, the outdoor drain filter comprising:
a side filtration means having a top and a base, the side filtration means configured to surround a perimeter of the outdoor drain;
a frame coupled to the top of the side filtration means and configured to define horizontal dimensions of the side filtration means;
an upper filtration means coupled to the top of the side filtration means at the frame; and
a diverter comprising an air vent connected to at least one lateral pipe, wherein the air vent is elevated above the frame of the outdoor drain filter and each of the at least one lateral pipe is connected to at least one downward elbow;
wherein a lower inner surface of each of the at least one lateral pipe defines a maximum water level where water will accumulate around the outdoor drain before being diverted into the drain through the diverter;
wherein the air vent causes a draw of water into the at least one downward elbow, then into the at least one respective lateral pipe when the maximum water level is reached;
wherein the diverter is configured such that water drawn into the at least one lateral pipe flows into the outdoor drain; and
wherein the outdoor drain filter is configured with an anchoring means, wherein the anchoring means causes the outdoor drain filter to remain positioned over the outdoor drain during operation.

2. The outdoor drain filter of claim 1, wherein the outdoor drain filter is configured as a single unit.

3. The outdoor drain filter of claim 1, wherein the anchoring means is selected from the group consisting of a weighted component, at least one bracket for receiving an external weight, and a thumb-turn configured to lock the outdoor drain filter to a drain cover of the outdoor drain.

4. The outdoor drain filter of claim 1, wherein the upper filtration means allows air and water to flow into the outdoor drain when unobstructed.

5. The outdoor drain filter of claim 1, wherein the frame defines the horizontal dimensions of the side filtration means.

6. The outdoor drain filter of claim 1, wherein the side filtration means comprises a plurality of side filtration members and a plurality of interstitial spaces, wherein the plurality of interstitial spaces define a side open drainage area.

7. The outdoor drain filter of claim 1, wherein the side filtration means at least partially prevents a movement of sediment into the outdoor drain.

8. The outdoor drain filter of claim 1, wherein the air vent comprises a vent pipe extending upward from the at least one lateral pipe and a downturn, wherein the downturn protrudes from the upward extension of the vent pipe.

9. The outdoor drain filter of claim 1, wherein each of the at least one downward elbow protrudes from the respective at least one lateral pipe.

10. The outdoor drain filter of claim 1, further comprising an outdoor drain cover of the outdoor drain.

11. The outdoor drain filter of claim 10, further comprising an outdoor drain reservoir of the outdoor drain.

12. The outdoor drain filter of claim 10, wherein the outdoor drain filter is configured as a single unit.

13. A method of maintaining the operability of an outdoor drain, the method comprising:
providing an outdoor drain filter of claim 12; and
fastening the outdoor drain cover of the outdoor drain filter to an outdoor drain reservoir of the outdoor drain;
wherein the side filtration means surrounds a perimeter of the outdoor drain cover.

14. The outdoor drain filter of claim 11, wherein the outdoor drain filter is configured as a single unit.

15. A method of maintaining the operability of an outdoor drain, the method comprising:
providing an outdoor drain filter of claim 14; and
connecting the outdoor drain reservoir of the outdoor drain filter to at least one effluent drain pipe;
wherein the side filtration means surrounds a perimeter of the outdoor drain cover.

16. A method of maintaining an effective drainage area of an outdoor drain cover, the method comprising:
providing an outdoor drain filter of claim 1;
positioning the outdoor drain filter above the outdoor drain such that the side filtration means surrounds a perimeter of the outdoor drain cover; and
anchoring the outdoor drain filter into position.

* * * * *